G. W. Scollay,

Coffin.

No. 1,330. Reissued Aug. 19, 1862.

Witnesses:
Charles Hadaway
Thomas C. Smith

Inventor:
George W. Scollay
By his Attorney
Amos Broadley.

N. PETERS, PHOTO-LITHOGRAPHER, WASHINGTON D. C.

UNITED STATES PATENT OFFICE.

GEORGE W. SCOLLAY, OF SAINT LOUIS, MISSOURI.

IMPROVEMENT IN BURIAL-CASES.

Specification forming part of Letters Patent No. 34,700, dated March 18, 1862; Reissue No. 1,330, dated August 19, 1862.

*To all whom it may concern:*

Be it known that I, GEORGE W. SCOLLAY, of the city and county of St. Louis and State of Missouri, have invented certain new and useful Improvements in Burial-Cases; and I do hereby declare the following to be a full, clear, and exact description of the same, reference being had to the annexed drawings, making part of this specification, in which—

Figure 2:
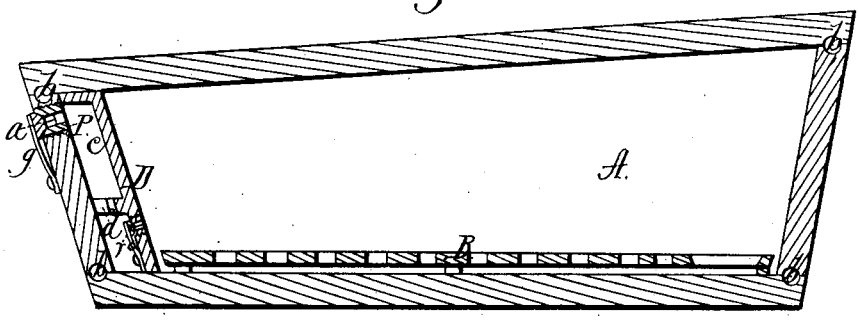
Figure 1:
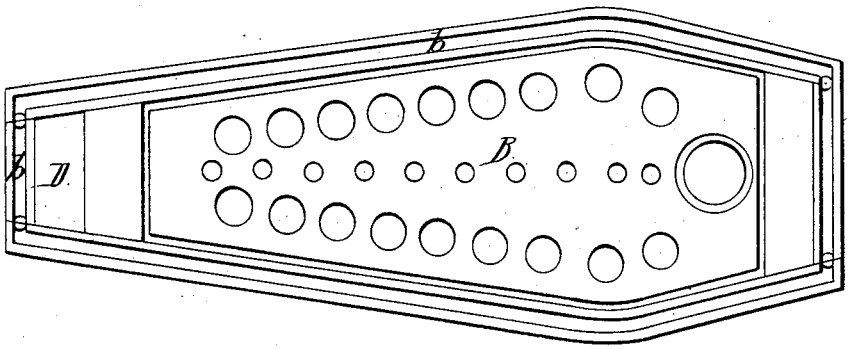

Figure 1 is a top view of my case with the lid off; and Fig. 2 is a vertical longitudinal section taken through the center thereof, showing the lid on.

As soon as a dead body begins to decompose there is evolved a kind of gas which is very offensive, as well as infectious, and noxious to the health of persons that breathe it; and there is also a kind of fluid generated by the decomposition of a dead body, which, in the case of large plethoric human beings, is considerable, and always exceedingly penetrating and offensive. Now, if a dead body put in a burial-case made of wood in the ordinary manner, the fluid aforesaid soon finds its way either through the wood or joints of the case, and the gas aforesaid will also escape through the wood or joints of the case if it be made in the ordinary manner, and if the case be made air-tight will soon generate pressure sufficient to burst it if no means be provided for its escape. These are great and serious difficulties when it is desired to keep the body uninterred for any considerable of time after death, that the friends of deceased may see it or have it sent to them. These difficulties I propose to overcome by producing a coffin or burial-case which shall be tight enough to retain the fluids generated by the decomposition of the human body, and by which the gases generated or evolved by such decomposition can be controlled, disinfected, and deodorized, so as not to burst the coffin when made to exclude the air and so to render it inocuous and inoffensive to the health and smell. To accomplish this object and to furnish a cheap article, I make the coffin of wood, in the following manner—that is to say:

I first make the different pieces to compose the coffin of the proper size and shape, and then groove them, as shown by *b*, wherever they are to be joined together. These grooves I then fill with any suitable cement, so that when the pieces are united a cement tongue will be between all the seams, the several parts being held together in the ordinary manner After the coffin has been thus made, I give the inside thereof a heavy coat of hot beeswax and resin to fill up the pores of the wood and cure any defects there may be in the lumber. There are other materials which may be used for this coating, such as asphaltum, tar, and the like; but it matters not what material is used for the coating, nor how it is applied, if it will resist the action of the fluids and gases generated by the decomposition or decay of the body, so as to protect the coffin and render it impervious to both, the object will be accomplished. This coating may also be applied to the inside of metallic coffins to great advantage, because it will increase their durability by protecting the iron from the action of the fluids, and consequently against corrosion. It will also close the pores and other imperfections of the case.

The coffin having been made and coated in manner as aforesaid, I fit a false end, D, in the foot thereof of such configuration as to form the chambers *c′ c*, with the perforated partition *d* between them. The chamber *c′*, I fit with a valve, *r*, opening in the chamber and hold it in position by means of a spring, *o*, or other convenient device. I also fit a valve, *a*, in the foot of the coffin, near the top, to communicate with the chamber *c*, which last-mentioned valve is held in position by means of the spring P. Both of the aforesaid valves are of metal, and have metal seats in the nature of tubular screws fit in the wood. The said valves and seats, however, need not necessarily be of metal, but may be made of india-rubber or anything that will make a tight joint and is not liable to deteriorate by the action of the gases. The chamber *c*, I fill with chlorine or other disinfecting and deodorizing material, or put as much of such substance in said chamber as experience may show to be necessary. There should also be enough charcoal or other absorbent united with the chlorine to keep it light and dry. I also put a perforated false bottom, B, in the coffin, with charcoal under it to absorb the moisture during the early stages of decomposition. Now, as soon as sufficient gas has been evolved by the decomposition of the body to generate pressure enough in the coffin to open the valves, it will escape from the coffin in the chamber $c'$, and pass up through the holes $v$ and the disinfecting and deodorizing substance in the chamber $c$ and out through the valve $a$, entirely inocuous and deodorized.

It is not absolutely necessary to use two valves; either one of them might be dispensed with and the same end would be accomplished. I have though it best, however, to show two valves in the drawings, for in case there be but one and it should become disarranged, the air would enter the coffin and hasten the decomposition of the body.

The life-like appearance of a dead body may be preserved for a few days after death by excluding the air therefrom, and it is to this end I use the valves; but when there is no object in thus preserving the body by excluding the air the valves may be dispensed with altogether and simply holes made in the chambers for the gas to escape through the deodorizing and disinfecting material as fast as it is generated.

The chamber for holding the disinfecting and deodorizing substance may be made in any convenient part of the coffin and of any desired form; but care should be taken to make it so that the gases may have free access to it before it escapes into the atmosphere, and I think it better to make the gas pass through the disinfecting and deodorizing material as it leaves the coffin.

Having now described the nature of my invention, what I claim as new, and desire to secure by Letters Patent, is—

1. Controlling, disinfecting, and deodorizing the gases as they escape from the coffin by making a hole or valve therein and combining and confining with or over said hole or valve the disinfecting and deodorizing material in some part of the coffin, which is to be otherwise air-tight.

2. Making a chamber, in combination with the coffin, for the purpose of holding the deodorizing and disinfecting material and causing the gases to pass through said chamber on their way out of the coffin.

3. The use of the valve $a$, in combination with the disinfecting and deodorizing chamber.

GEORGE W. SCOLLAY.

Witnesses:
AMOS BROADNAX,
EDWARD WYMAN.